United States Patent
Nishihata

(10) Patent No.: US 8,615,762 B2
(45) Date of Patent: Dec. 24, 2013

(54) MULTIPROCESSOR SYSTEM, MULTIPLE THREADS PROCESSING METHOD AND PROGRAM

(75) Inventor: Yoshihiko Nishihata, Tokyo (JP)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 12/996,922

(22) PCT Filed: Jun. 12, 2009

(86) PCT No.: PCT/JP2009/061148
§ 371 (c)(1),
(2), (4) Date: Dec. 8, 2010

(87) PCT Pub. No.: WO2010/001736
PCT Pub. Date: Jan. 7, 2010

(65) Prior Publication Data
US 2011/0093859 A1    Apr. 21, 2011

(30) Foreign Application Priority Data

Jul. 4, 2008  (JP) ................. 2008-175456

(51) Int. Cl.
*G06F 9/46*   (2006.01)
(52) U.S. Cl.
USPC ............ 718/100; 718/102; 718/103; 718/104
(58) Field of Classification Search
USPC .................. 718/100, 102, 103, 104
See application file for complete search history.

(56) References Cited

U.S. PATENT DOCUMENTS

| | | | | |
|---|---|---|---|---|
| 5,745,778 | A  * | 4/1998 | Alfieri .............................. | 712/1 |
| 6,915,516 | B1 * | 7/2005 | Glidewell ..................... | 718/103 |
| 7,370,243 | B1 * | 5/2008 | Grohoski et al. ............... | 714/48 |
| 2004/0093602 | A1 * | 5/2004 | Huston et al. ................. | 718/107 |
| 2004/0139441 | A1 * | 7/2004 | Kaburaki et al. ............. | 718/107 |
| 2006/0123420 | A1 * | 6/2006 | Nishikawa .................... | 718/104 |
| 2007/0300230 | A1 * | 12/2007 | Barsness et al. ............. | 718/103 |
| 2008/0005737 | A1 * | 1/2008 | Saha et al. .................... | 718/100 |

FOREIGN PATENT DOCUMENTS

| | | |
|---|---|---|
| JP | 3-113563 A | 5/1991 |
| JP | 5-242051 A | 9/1993 |
| JP | 6-12392 A | 1/1994 |
| JP | 6-75786 A | 3/1994 |
| JP | 10-91594 A | 4/1998 |
| JP | 2006155480 A | 6/2006 |

OTHER PUBLICATIONS

International Search Report for PCT/JP2009/061148 mailed Aug. 18, 2009.

\* cited by examiner

*Primary Examiner* — Emerson Puente
*Assistant Examiner* — Charles Swift

(57) ABSTRACT

Conventionally, when the amount of data to be processed increases only for a part of threads, the processing efficiency of the whole transaction degrades. A multiprocessor system of the invention includes a plurality of processors executing multiple threads to process data; and a means which, based on an amount of data to be processed for each thread, determines a condition which an order in which the plurality of processors execute the threads should satisfy and starts to execute each thread so that the condition is satisfied.

9 Claims, 15 Drawing Sheets

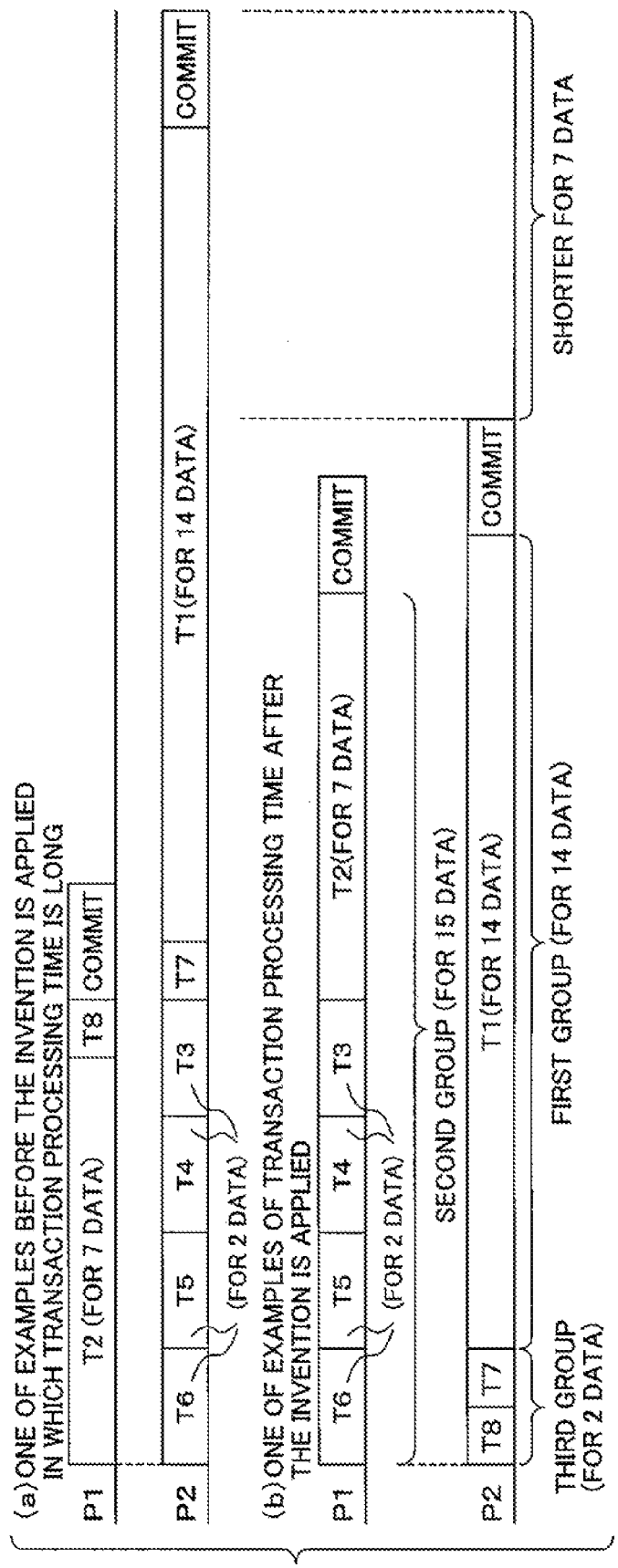

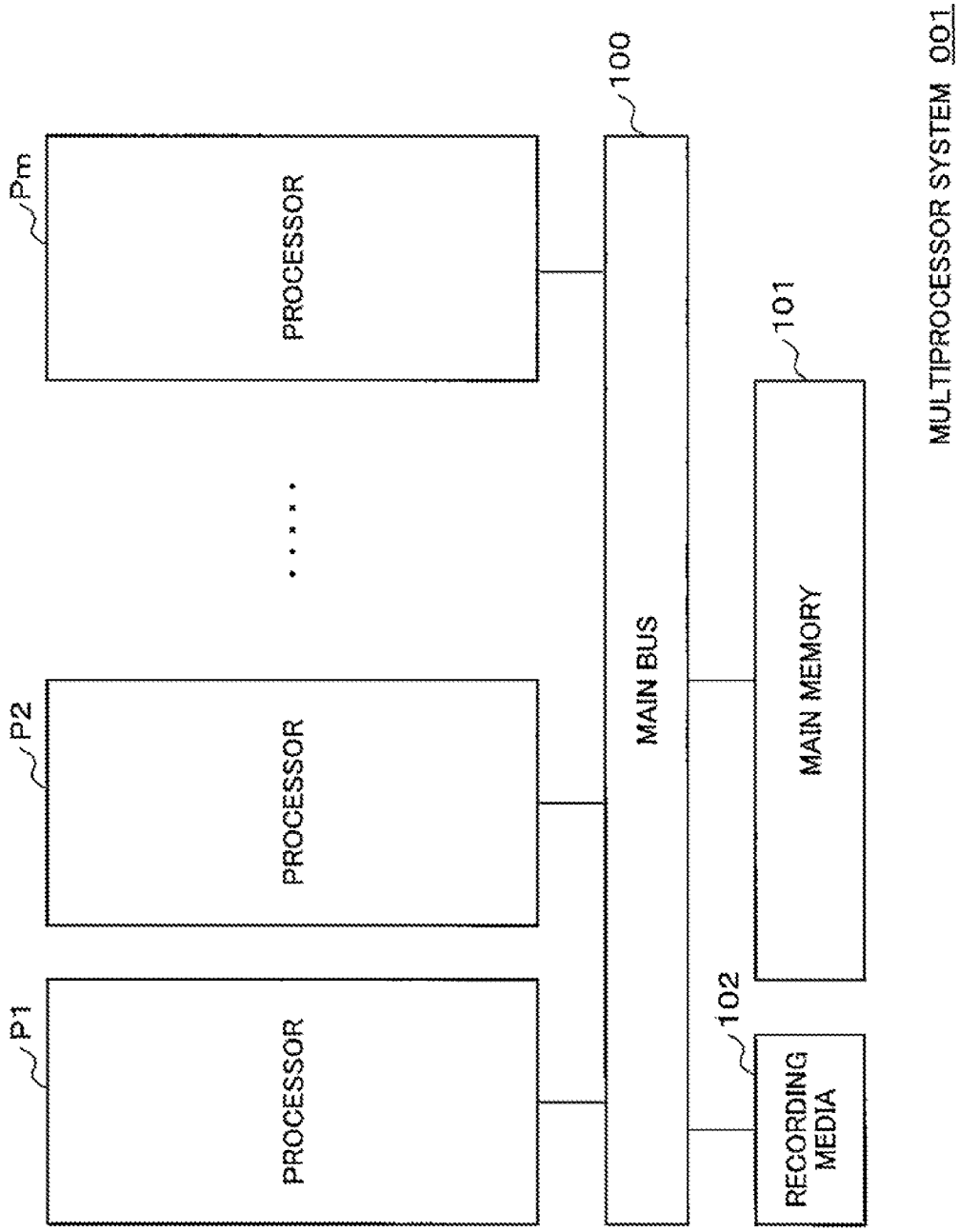

Fig.9

◆ AN EXAMPLE IN WHICH AMOUNT OF DATA IS UNIFORM

TWO CPUS (P1, P2), EIGHT THREADS (T1~T8).
AMOUNT OF DATA FOR EACH THREAD IS 4

ONE OF EXAMPLES BEFORE AND AFTER THE INVENTION IS APPLIED

| P1 | T1 | T1 | T1 | T2 | T2 | T2 | T3 | T3 | T3 | T4 | T4 | T4 | COMMIT |
| P2 | T5 | T5 | T5 | T6 | T6 | T6 | T7 | T7 | T7 | T8 | T8 | T8 | COMMIT |

Fig.10

◆ AN EXAMPLE IN WHICH DATA IMBALANCE OCCURRED

TWO CPUS (P1, P2), EIGHT THREADS (T1~T8),
AMOUNT OF DATA OF T1 IS 25, AMOUNT OF DATA OF T2-T8 IS 1

(1) ONE OF EXAMPLES BEFORE THE INVENTION IS APPLIED WHEN
TRANSACTION PROCESSING TIME IS SHORT

P1 | T1 (FOR 25 DATA) | COMMIT
P2 | T2 | T6 | T4 | T5 | T3 | T7 | T8 | COMMIT (2) ONE OF EXAMPLES BEFORE THE INVENTION IS APPLIED WHEN
TRANSACTION PROCESSING TIME IS LONG

P1 | T2 | T6 | T4 | T1 (FOR 25 DATA) | COMMIT
P2 | T5 | T3 | T7 | T8 | COMMIT (3) ONE OF EXAMPLES OF TRANSACTION PROCESSING TIME
AFTER THE INVENTION IS APPLIED

P1 | T1 (FOR 25 DATA) | COMMIT
P2 | T8 | T7 | T6 | T5 | T4 | T3 | T2 | COMMIT

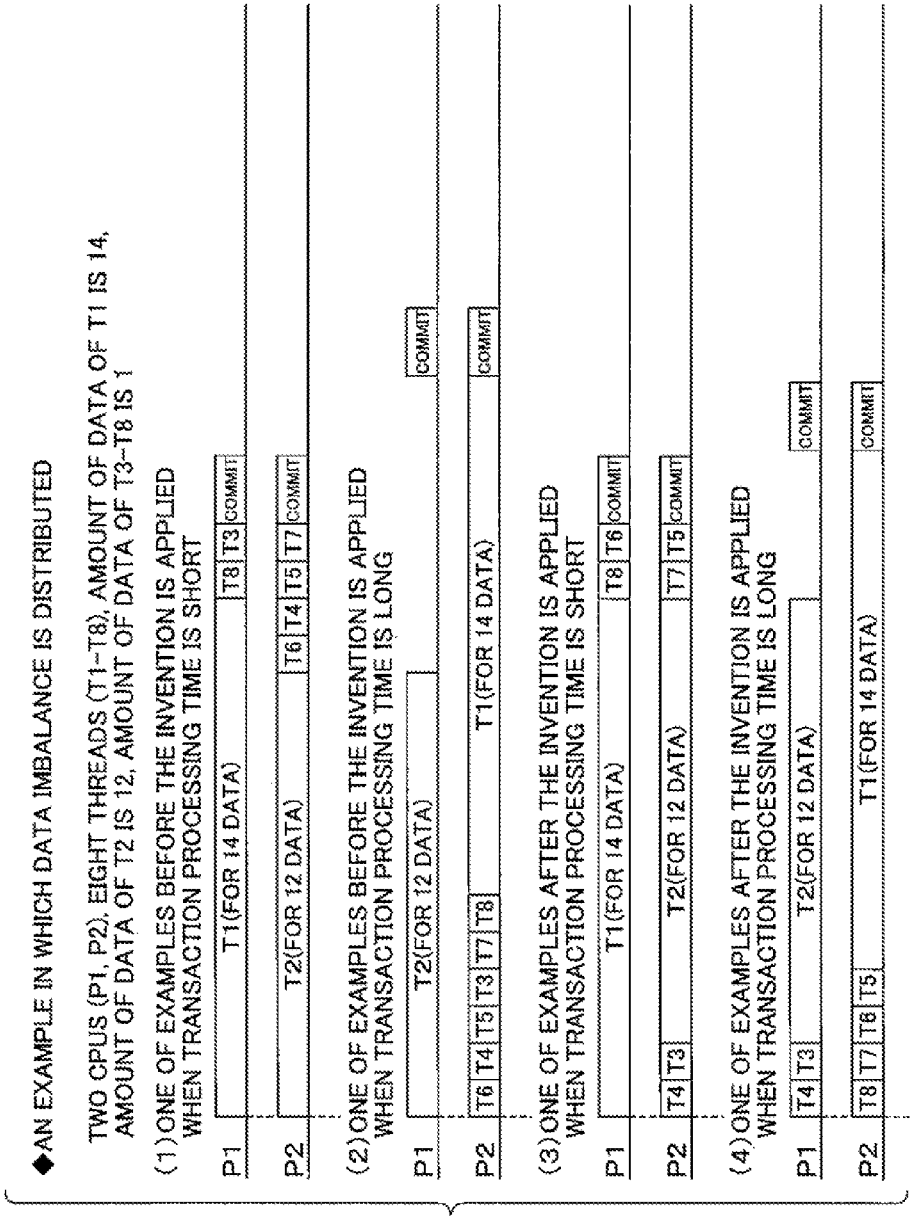

Fig.12

◆ EXAMPLE 1 IN WHICH DATA IMBALANCE OCCURS
AND ANOTHER TRANSACTION IS ALSO PERFORMED

TWO CPUS (P1, P2)

EIGHT THREADS FOR TRANSACTION X (T1–T8),
AMOUNT OF DATA OF T1 IS 25, AMOUNT OF DATA OF T2–T8 IS 1

EIGHT THREADS FOR TRANSACTION Y (A1–A8),
AMOUNT OF DATA OF A1–A8 IS 3

(1) ONE OF EXAMPLES BEFORE THE INVENTION IS APPLIED

| P1 | T2 | T6 | T4 | T1 | A6 | A5 | A7 | A8 | T1 (FOR 24 DATA) | COMMIT |
| P2 | T5 | T7 | T3 | T8 | A2 | A3 | A1 | A4 | COMMIT |

(2) ONE OF EXAMPLES BEFORE/AFTER THE INVENTION IS APPLIED

| P1 | T1 (FOR 4 DATA) | A6 | A5 | A7 | A8 | T1 (FOR 21 DATA) | COMMIT |
| P2 | T8 | T7 | T6 | T5 | A2 | A3 | A1 | A4 | T4 | T3 | T2 | COMMIT |

Fig. 13

MULTIPROCESSOR SYSTEM, MULTIPLE THREADS PROCESSING METHOD AND PROGRAM

This application is the National Phase of PCT/JP2009/061148. filed Jun. 12, 2009 which claims priority based on Japanese Patent Application No. 2008-175456 filed on Jul. 4, 2008 and the disclosure thereof is incorporated herein in its entirety.

TECHNICAL FIELD

The present invention relates to a multiprocessor system, a multiple threads processing method and a program.

BACKGROUND ART

In a multiprocessor system, high speed processing is achieved by scheduling and processing multiple threads. An example of such a multiprocessor system is disclosed in patent document 1.

[Patent document 1] Japanese Patent Application Laid-Open No. 2006-155480

DISCLOSURE OF THE INVENTION

Problems to be Solved by the Invention

In a multiprocessor system disclosed in patent document 1, when a multiprocessor pursues high speed processing by combining a plurality of data, processing them with one transaction, and reducing the number of commit processing and scheduling cost, the following problem occurs. In the above-mentioned multiprocessor system, when the amount of data increases only for a part of threads, the processing efficiency of the whole transaction degrades.

The reason is as follows. When a multiprocessor performs thread processing allocation to each processor, the multiprocessor cannot predict the amount of data that the thread processes. Accordingly, the multiprocessor may not necessarily perform allocation which achieves good processing efficiency. For example, in case the multiprocessor defers the processing of a thread which has to process large amount of data, the processing of the whole transaction may be delayed.

The object of the present invention is to provide a multiprocessor system, a multiple threads processing method and a program to solve the problem mentioned above.

Means for Solving the Problem

A multiprocessor system of the invention includes a plurality of processors executing multiple threads to process data; and a means which, based on an amount of data to be processed for each thread, determines a condition which an order in which the plurality of processors execute the threads should satisfy and starts to execute each thread so that the condition is satisfied.

A multiple threads processing method of the invention includes based on an amount of data to be processed for each thread, determining a condition which an order in which a plurality of processors execute threads should satisfy, and making a plurality of processors start to execute each thread so that the condition is satisfied.

A program of the invention makes a computer function as a means which, based on an amount of data to be processed for each thread, determines a condition which an order in which a plurality of processors execute the threads should satisfy and makes the plurality of processors start to execute each thread so that the condition is satisfied.

Effect of the Invention

The present invention has the effect that the performance efficiency of the whole transaction is not likely to degrade even when the amount of data to be processed increases only for a part of threads.

BRIEF DESCRIPTION OF THE DRAWINGS

FIG. 3 is a figure showing an example of transaction processing FIG. 4 is a figure showing a hardware configuration of multiprocessor system 001

FIG. 9 is a figure showing an example in which amounts of data are uniform

FIG. 10 is a figure showing an example in which data imbalance occurred

FIG. 11 is a figure showing an example in which data imbalance is distributed FIG. 12 is a figure showing example 1 in which data imbalance occurred and processing of other transactions is also performed FIG. 13 is a figure showing example 2 in which data imbalance occurred and processing of other transactions is also performed.

DESCRIPTION OF CODE

M[I] Allocation memory
P[I] Processor
T[I] Thread
001 Multiprocessor system
100 Main bus
101 Main memory
102 Recording media
200 Data processing control unit CT
201 Data reading section RD
202 Data processing starting section FS
203 Next data processing starting section NS
204 Commit section CR
205 Data processing starting section FS(2)
400 Maximum Amount of to-be-processed-data register MX
500 Processed data counter PC
600 Database

MOST PREFERRED MODE FOR CARRYING OUT THE INVENTION

Figure 1:
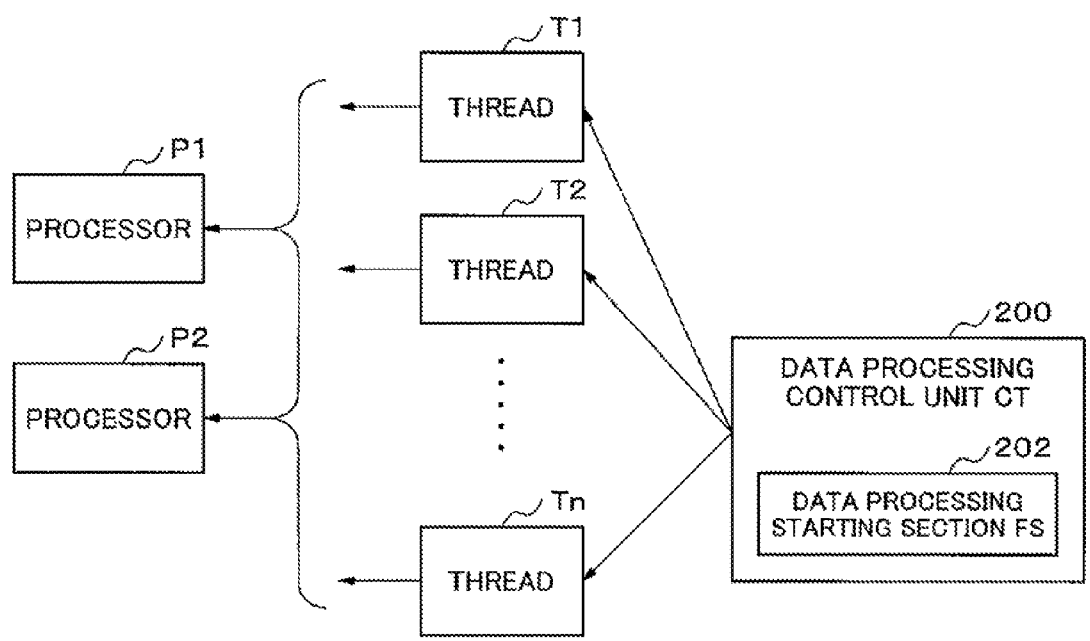
FIG. 1 is a figure showing a structure of multiprocessor system 001

FIG. 1 is a figure showing a structure of multiprocessor system 001. Multiprocessor system 001 includes processor P1, processor P2 and data processing control unit CT 200.

Processor P1 and processor P2 process data by executing multiple threads.

Data processing control unit CT 200 includes data processing starting section FS 202. Data processing starting section FS 202 controls the order in which processors P1 and P2 process the threads, based on the amount of data each thread processes.

The present invention has the effect that the performance efficiency of the whole transaction is not likely to degrade even when the amount of data to be processed increases only for a part of threads. This is because data processing starting section FS 202 controls the order in which processors P1 and P2 process the threads, based on the amount of data each thread processes.

The outline of the first embodiment of the present invention is as follows. The first embodiment divides a plurality of threads into groups so that the amount of data to be processed becomes as uniform as possible among the groups, and performs processing.

Figure 2A:
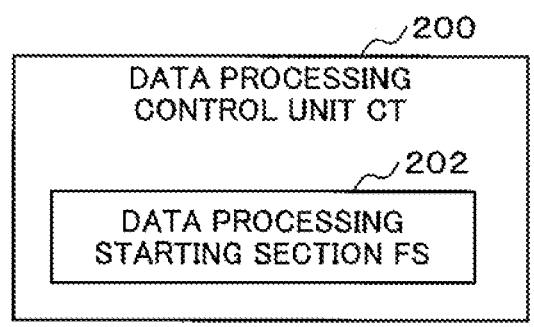
FIG. 2A is a figure showing a structure of data processing control unit CT 200 of the first embodiment

FIG. 2A is a figure showing a structure of data processing control unit CT 200. Data processing control unit CT 200 includes data processing starting section FS 202.

Data processing starting section FS 202 divides a plurality of threads into a plurality of groups based on the amount of data to be processed by each thread, and issues a data processing starting instruction to one thread of each of the plurality of groups for starting to execute the thread.

The first embodiment has the effect that the performance efficiency of the whole transaction is not likely to degrade even when the amount of data to be processed increases only for a part of threads.

This is because it divides the plurality of threads into groups so that the amount of data to be processed becomes as uniform as possible among the groups, and processes the data.

A specific example of the effect is as follows.

FIG. 3 is a figure showing an example of transaction processing. (a) is one of examples before the invention is applied in which transaction processing time is long. (b) is one of examples of transaction processing time after the invention is applied.

In (b), because a thread with the largest amount of data to be processed by the thread is T1, data processing starting section FS 202 assigns T1 (14 data) to the first group and assigns T6-T2 to the second group (15 data). The total amount of data which the threads of the second group (T6-T2) are to process is 15, and this is almost the same amount of data as the amount of data for the thread of the first group (T1) to process, which is 14. And data processing starting section FS 202 assigns threads (T8 and T7) which belong to neither of the first group or the second group to the third group (2 data).

Example (a) has longer processing time for 7 data than example (b). The reason is as follows.

In example (a), after executing threads T2 and T8, processor P1 does not executes a thread. Therefore, processor P1 is in the state of idle concerning this transaction processing. On the other hand, after executing threads T6-T3 and T7, processor P2 executes thread T1.

In contrast, in example (b), although processor P1 does not execute thread T8, but executes not only thread T2 but also threads T6-T3 which are executed by processor P2 in example (a). Thus the period of processor P1 being idle becomes short, and transaction processing time of (b) becomes shorter than (a).

The outline of the second embodiment is as follows. The second embodiment executes with high priority a thread whose amount of data to be processed is large.

Figure 2B:
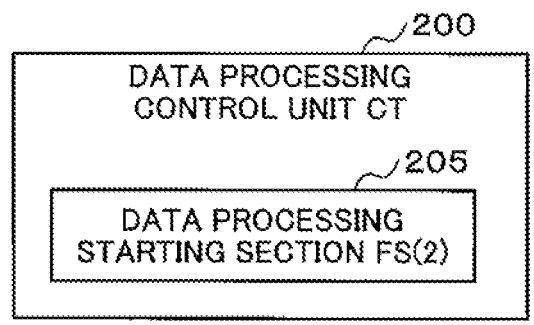
FIG. 2B is a figure showing a structure of data processing control unit CT 200 of the second embodiment

FIG. 2B is a figure showing a structure of data processing control unit CT 200. Data processing starting section FS(2) 205 sets thread priority of a thread whose amount of data to be processed is large to high (D003). When processors P1 and P2 shown in FIG. 1(a) execute threads, they start execution from a thread with high thread priority, that is a thread whose amount of data to be processed is large.

The second embodiment also has the effect that the performance efficiency of the whole transaction is not likely to degrade even when the amount of data to be processed increases only for a part of threads.

This is because the priority of a thread whose amount of data to be processed is large is set to high and the processing of the thread is not deferred.

Below is a detailed description of the first embodiment

FIG. 4 is a figure showing a hardware configuration of multiprocessor system 001. Multiprocessor system 001 includes processors P[I] (I=1~m), main bus 100 and main memory 101. Processor P[I] is, for example, a CPU (Central Processing Unit), and by executing a program, the function of the after-mentioned multiprocessor system 001 is realized.

Multiprocessor system 001 may include a reading device for computer-readable recording media 102 which stores a program. A program is loaded into main memory 101 from computer-readable recording media 102 and executed.

Figure 5:
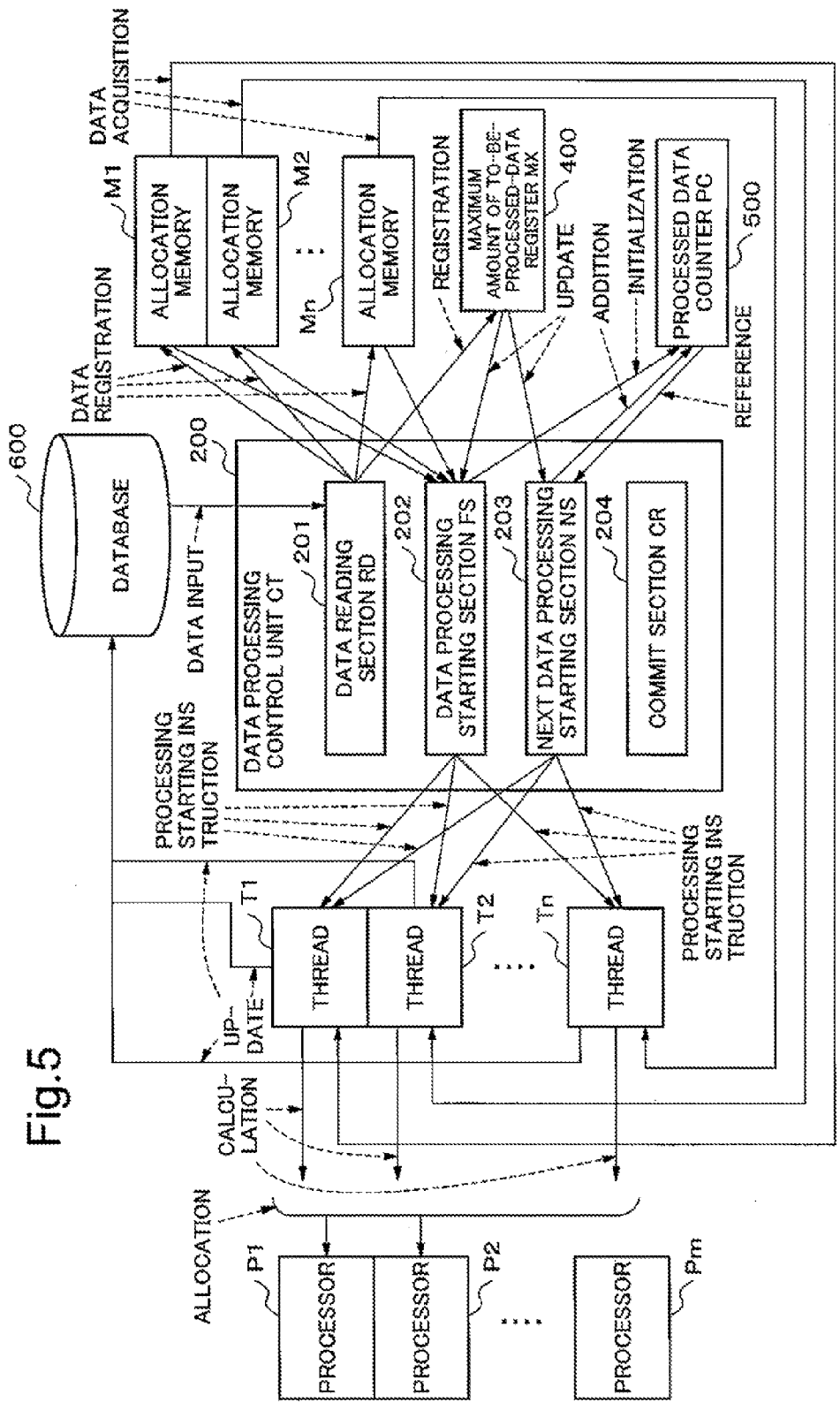
FIG. 5 is a figure showing a structure of multiprocessor system 001 of the first embodiment

FIG. 5 is a figure showing a structure of multiprocessor system 001 of the first embodiment The meanings of the abbreviation shown in FIG. 5 are:

[CT: Control Thread]
[RD: Read Data device]
[FS: First Start device]
[NS: Next Start device]
[CR: Commit/Rollback device]
[M: sort Memory]
[MX: register of the Maximum number of data]
[PC: Processed data Counter].

Multiprocessor system 001 includes processor P[I], data processing control unit CT 200, allocation memory M[I] (I=1~n), maximum amount of to-be-processed-data register MX 400, processed data counter PC 500 and database 600. Thread T[I] (I=1~n) is generated by OS (Operating System, not shown). Multiprocessor system 001 updates database 600 when processor P[I] executes assigned threads T[I] processing data corresponding to the threads to perform transaction processing.

For example, one of processors P[I] shown in FIG. 4 functions under the program control as data processing control unit CT 200. Data processing control unit CT 200 operates, for example, as a different process than a process of thread T[I]. The way to realize the function which data processing control unit CT 200 fulfils is not limited to this, and it may be realized by different hardware than processor P[I].

Data processing control unit CT 200 includes data reading section RD 201, data processing starting section FS 202, next data processing starting section NS 203 and commit section CR 204.

Allocation memory M[I], maximum amount of to-be-processed-data register MX 400 and processed data counter PC 500 are, for example, set up in main memory 101 shown in FIG. 4.

The function of each block shown in FIG. 5 will be described in detail using FIG. 6 to FIG. 8.

Figure 6:
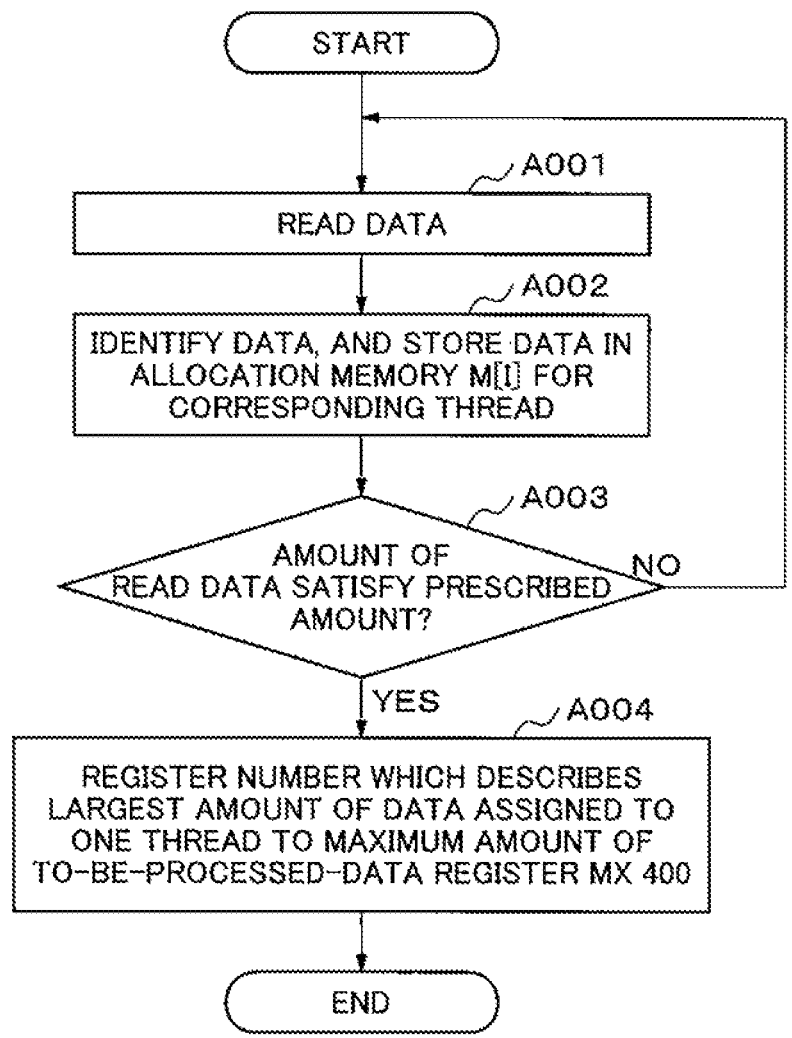
FIG. 6 is a flow chart showing operations of data reading section RD 201

FIG. 6 is a flow chart showing operations of data reading section RD 201.

Data reading section RD 201 of data processing control unit CT 200 acquires data from files of database 600, and stores it in allocation memory M[I] corresponding to thread T[I] which processes the data. Data reading section RD 201 performs this process for the amount of data to be processed in one transaction, and stores the number which describes the largest amount of data assigned to one thread T[I] to maximum amount of to-be-processed-data register MX 400.

Specifically, data reading section RD 201 performs the following operations.

First, data reading section RD 201 reads data from database 600 (A001). OS uniquely decides the storage position of a file for each process to read. Data reading section RD 201 reads data from the position where a file corresponding to a process currently being executed is stored.

Data reading section RD 201 identifies the data, and stores the data in allocation memory M[I] for corresponding thread (A002). The data includes information which specifies the corresponding thread. Data reading section RD 201 stores the read data in allocation memory M[I] based on this information.

Data reading section RD 201 judges if the amount of read data satisfied the prescribed amount (A003). A user inputs in advance the upper limit of the amount of data to be processed within one transaction to multiprocessor system 001. The upper limit of the amount of data will be the prescribed amount.

Data reading section RD 201 registers the number which describes the largest amount of data assigned to one thread to maximum amount of to-be-processed-data register MX 400 (A004).

Figure 7:
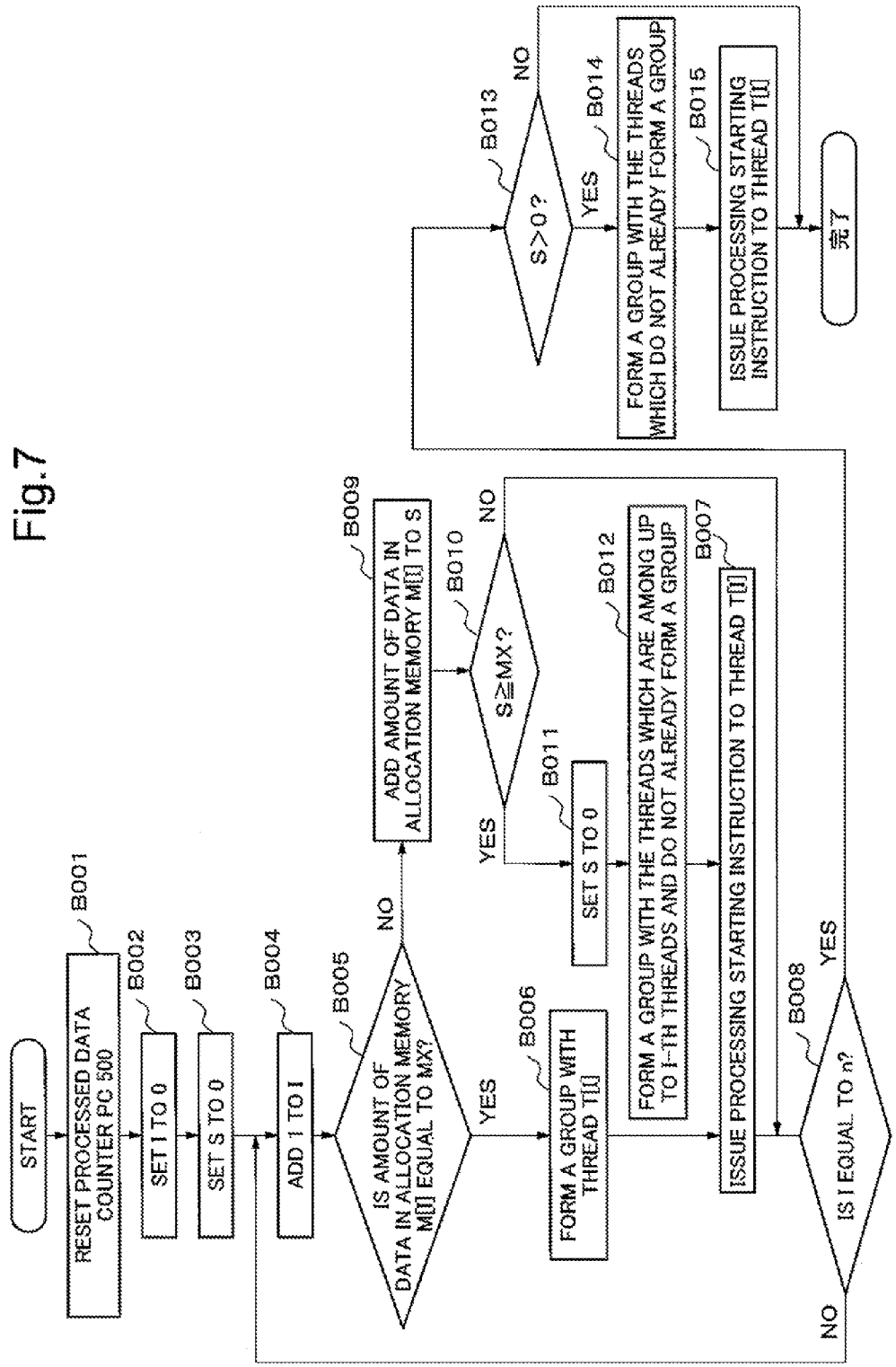
FIG. 7 is a flow chart showing operations of data processing starting section FS 202

FIG. 7 is a flow chart showing operations of data processing starting section FS 202.

Data processing starting section FS 202 divides a plurality of threads into a plurality of groups based on the amount of data to be processed by each thread, and issues a data processing starting instruction to one thread of each of the plurality of groups. Specifically, data processing starting section FS 202 compares the amount of data stored in allocation memory M[I] and the value in maximum amount of to-be-processed-data register MX 400 and divides the threads into the groups according to the following condition:

1. Assign one thread whose amount of data is equal to the value in maximum amount of to-be-processed-data register MX 400 (thread whose amount of data processed by the thread is largest) to the first group;

2. Assign a plurality of threads, picked up from the threads which do not already form a group, whose sum of the amount of data is about the same as the value of maximum amount of to-be-processed-data register MX 400 (example: the sum of the amounts of data exceeds the value of maximum amount in to-be-processed-data register MX 400 a little, (example: sum of the amounts of data is not less than the value in maximum amount of to-be-processed-data register MX 400, and the difference with the amount of data of the first group is less than the amount of data to-be-processed by a thread within this group)) to the second groups;

3. Assign all threads which belong to neither of the first group or the second groups into the third group.

And data processing starting section FS 202 instructs to start data processing to one thread of each group.

Specifically, data processing starting section FS 202 performs the following processing.

First, data processing starting section FS 202 resets processed data counter PC 500 (B001). Next, data processing starting section FS 202 sets variable I to 0 (B002). Next, data processing starting section FS 202 sets variable S to 0 (B003). Next, data processing starting section FS 202 adds 1 to I (B004). Next, data processing starting section FS 202 judges if the amount of data in allocation memory M[I] is equal to MX (B005). In case the amount of data in allocation memory M[I] is equal to MX (B005, Yes), data processing starting section FS 202 forms a group with thread T[I] (B006). Further, when data processing starting section FS 202 forms a group with thread T[I], it stores, for example, identification number of the group in the control table of thread T[I]. Next, data processing starting section FS 202 issues a processing starting instruction to thread T[I] (B007).

In the processing of above-mentioned B005, in case the amount of data of allocation memory M[I] is not equal to MX (B005, No), data processing starting section FS 202 adds the amount of data in allocation memory M[I] to S (B009). Next, data processing starting section FS 202 judges if S>=MX (B010). In case S>=MX (B010, Yes), data processing starting section FS 202 sets S to 0 (B011). Next, data processing starting section FS 202 forms a group with the threads which are among up to I-th threads and do not already form a group (B012). Further, when data processing starting section FS 202 forms a group with a plurality of threads T[I], it stores, for example, identical identification number of the group and so on in the control tables of the plurality of threads T[I]. Next, data processing starting section performs the processing of above-mentioned B007. In case the processing of B007 is completed, or in case S>=MX is not true (B010, No), data processing starting section FS 202 judges if I is equal to n (B008).

In case I is not equal to n (B008, No), data processing starting section FS 202 goes to the processing of B004. On the other hand, in case I is equal to n (B008, Yes), data processing starting section FS 202 judges if S>0 is true (B013). In case S>0 (B013, Yes), data processing starting section FS 202 forms a group with the threads which do not already form a group (B014). Next, data processing starting section FS 202 issues a processing starting instruction to thread T[I] (B015). In case S>0 is not true (B013, No), or in case the processing of B015 is completed, data processing starting section FS 202 ends the processing shown in a flow chart of FIG. 7.

In B007 and B015, each thread T[I] which received a data processing starting instruction is executed as soon as an processor becomes available, and processes assigned data.

Figure 8:
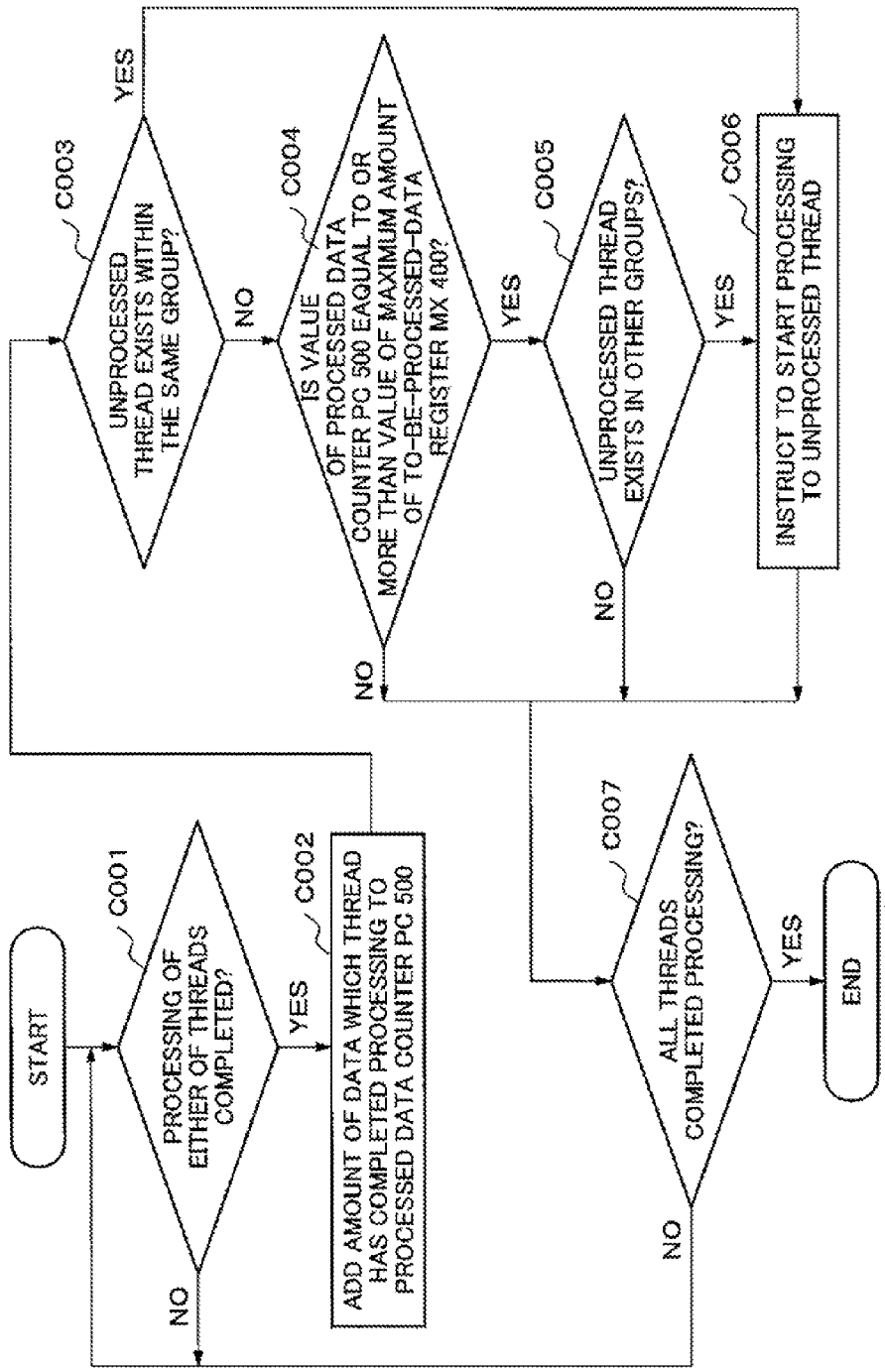
FIG. 8 is a flow chart showing operations of next data processing starting section NS 203

FIG. 8 is a flow chart showing operations of next data processing starting section NS 203.

When a certain thread has completed the processing of data, next data processing starting section NS 203 adds the amount of data whose processing is completed to processed data counter PC 500. And in case there exits a thread, when a thread completed data processing, whose data is unprocessed within the same group to which the thread concerned belongs, next data processing starting section NS 203 issues a data processing starting instruction to the unprocessed thread. On the other hand, in case there exists no thread, when a thread completed data processing, whose data is unprocessed within the same group to which the thread concerned belongs, next data processing starting section NS 203 issues a data processing starting instruction to a thread of other group whose data is unprocessed. And next data processing starting section NS 203 repeats the above-mentioned processing until the processing of all the threads is completed.

Specifically, next data processing starting section NS 203 performs the following processing. First, next data processing starting section NS 203 judges if the processing of either of threads is completed (C001). In case the processing of either of threads is completed (C001, Yes), next data processing starting section NS 203 adds the amount of data which the thread has completed processing to Processed data counter PC 500 (C002). Next, next data processing starting section NS 203 judges if an unprocessed thread exists within the same group (C003). In case an unprocessed thread does not exist within the same group (C003, No), next data processing starting section NS 203 judges if the value of processed data counter PC 500 is equal to or more than the value of maximum amount of to-be-processed-data register MX 400 (C004). This judgment is for the purpose of restraining starting of a thread of other groups until a thread with large amount of data such as the thread of the first group is completed, even when threads of the third group and so on are all executed. By this restraint, prompt execution of a thread with a large amount of data is achieved. In case the value of processed data counter PC 500 is equal to or more than the value of maximum amount of to-be-processed-data register MX 400 (C004, Yes), next data processing starting section NS 203 judges if an unprocessed thread exists in other groups (C005). In case an unprocessed thread exists in other groups (C005, Yes), or when an unprocessed thread exists in the same group (C003, Yes), next data processing starting section NS 203 instructs to start processing to the unprocessed thread (C006).

In case the value of processed counter PC 500 is less than the value of maximum amount of to-be-processed-data register MX 400 (C004, No), or in case an unprocessed thread does not exist in other groups (C005, No), or in case the processing of 0006 is completed, the following processing is performed.

Next data processing starting section NS 203 judges if all threads completed processing (C007). In case not all the threads have completed processing (C007, No), or in case the processing of either of threads has not completed in the processing of 0001 (C001, No), next data processing starting section NS 203 goes to the processing of C001.

Through the processing described in FIG. 6, FIG. 7 and FIG. 8, the threads process data, and multiprocessor system 001 updates database 600. If all threads have completed the processing of data, commit section CR 204 performs the commit processing of transaction. Data processing control unit CT 200 starts the processing of FIG. 6 again in order to process new data. At this moment, groups of threads which were already formed disappear, and multiprocessor system 001 forms new groups according to the amount of data to be processed.

Next, an example will be described in detail with reference to a drawing. The degree of the effect of the present invention varies depending on the number of processors P[I], the number of threads, the other amounts of operations and the degree of imbalance of the amount of data and so on. An example assumes:

Processor P1 and processor P2 in total of two
One data processing control unit CT 200
Eight threads T1-T8.

In the example, other amounts of operations and degree of imbalance of the amount of data vary appropriately.

Because the number of processors is two, the number of threads which can perform data processing simultaneously is two. Which thread processors P1 or P2 will process depends on the state of processors P1 and P2. In case a thread to be processed exists, processors P1 and P2 perform processing without being idle. Between processors P1 and P2, one which has completed the processing of one thread and becomes idle will start the processing of the next thread.

It is supposed that the time for processors P1 or P2 to process one data is T. It is supposed that the processing time of data reading section RD 201 and the processing time of commit section CR 204 are $\alpha$. It is supposed that the time for other control is $\beta$, and is shorter compared with T and $\alpha$. Also, MAX(A, B) in the following sentences means larger value between A and B.

FIG. 9 is a figure showing an example in which the amount of data is uniform.

In case data is assigned to each thread uniformly, processing time does not vary between before and after the invention is applied. As shown in FIG. 9, when the amount of data per one thread is supposed to be 4, and supposing that processor P1 and processor P2 are not used for other calculation, processing time for transaction before the invention is applied will be 16 T+$\alpha$+$\beta$. After the invention is applied, each thread will form a group, and data processing starting section FS 202 instructs to start data processing to all threads. Therefore, processing time for transaction does not differ from before the invention is applied and will be 16 T+$\alpha$+$\beta$.

FIG. 10 is a figure showing an example in case data imbalance occurred.

In case the amount of data assigned to a certain thread is larger than the amount of data assigned to all the other threads, depending on the assignment of processing between processor P1 and processor P2, time for one transaction may vary. Compared to the case when processing time becomes largest which occurs before the invention is applied, after the invention is applied, processing time becomes shorter.

As shown in FIG. 10, suppose that one thread T1 processes 25 data and seven other threads T2-T8 process 1 data respectively. Supposing that processors P1 and P2 are not used for other calculation, processing time for transaction before the invention is applied becomes as follows.

As shown in (1), one example of which transaction processing time becomes minimum is the case when one processor P1 processes the thread which processes 25 data, and another processor P2 processes other threads T2-T8. Processing time for transaction will be (MAX(25 T, 7 T)+$\alpha$+$\beta$)=25 T+$\alpha$+$\beta$.

As shown in (2), one example of which transaction processing time becomes long is the case when two processors P1 and P2 first process three threads each among six threads whose amount of data is one, and process the remaining thread afterwards. Processing time for transaction will be (3 T+MAX(25 T, T)+$\alpha$+$\beta$)=28 T+$\alpha$+$\beta$.

As shown in (3), after the invention is applied, a thread which processes 25 data will become one group, and remaining threads form another group. Thread T1 which processes 25 data and one of the threads whose amount of data is one (thread T8) start data processing first, and when thread T8 whose amount of data is one completes the processing, threads begin to start processing after that, in turn and one at a time. Therefore, processing time for transaction will become (MAX(25 T, 7 T)+$\alpha$+$\beta$)=25 T+$\alpha$+$\beta$, and is reduced by 3 T compared to example (2) which is before the invention is applied and takes long time FIG. 11 is a figure showing an example in which data imbalance is distributed.

In case a plurality of threads exist to which large amount of data is assigned, the present invention has the effect like the example shown in FIG. 10. As shown in FIG. 11, one thread T1 processes 14 data, another thread T2 processes 12 data, and six of other threads T3-T8 process one data. It is supposed that processors P1 and P2 are not used for other calculation. Transaction processing time before the invention is applied becomes as follows.

As shown in (1), one example in which transaction processing time becomes shortest is the following case. One processor P1 processes thread T1 which processes 14 data and two of thread T8 and thread T3 whose amount of data are one. And the other processor P2 processes thread T2 which processes 12 data and four of threads T4-T7 whose amount of data are one. After each processing is completed, processors P1 and P2 process the remaining thread. Processing time for transaction will be (MAX(14 T+T*2, 12 T+T*4)+α+β)=16 T+α+β.

As shown in (2), one example in case transaction processing time is long, is the following case. One processor P1 processes thread T2 whose amount of data is 12 first. The other processor P2 processes thread T1 whose amount of data is 14 after processing six of threads whose amount of data are one. Processing time for transaction will be (MAX(12 T, T*6+14 T)+α+β)=20 T+α+β.

In contrast, after the invention is applied, data processing starting section FS 202 forms the first group including thread T1 whose amount of data is 14 and the second group including thread T2 whose amount of data is 12, and thread T3 and thread T4 whose amount of data are one. And data processing starting section FS 202 forms the third group including remaining threads T5-T8 whose amount of data are one. As a result, transaction, processing time becomes as follows.

As shown in (3), in one example in which transaction processing time after the invention is applied is short, two processors P1 and P2 first process thread T1 of the first group and two threads T4 and T3 of the second group whose amount of data are one. Processor P2 processes thread T2 whose amount of data is 12 after completing the processing of threads T4 and T3. Finally, two processors P1 and P2 process four threads T8-T5 of group 3. Processing time for transaction will be (MAX(14 T+T*2, 12 T+T*2+T*2)+α+β)=16 T+α+β.

As shown in (4), in one example in case transaction processing time after the invention is applied is long, two processors P1 and P2 first process threads T8-T5 of the third group and thread T4-2 of the second group. Processor P2 processes the thread of the first group after processing threads T8-T5 of the third group whose sum of the amount of data is small. Processing time for transaction will be (MAX(12 T+T*2, T*4+14 T)+α+β)=18 T+α+β. In the present invention, data processing starting section FS 202 issues a data processing starting instruction almost simultaneously to one thread of each of groups 1, 2 and 3. From which group processors P1 and P2 start processing threads depends on the processing status of processors 1 and 2. Therefore, there is a case in which the processing of thread T1 (group T1) whose amount of data to be processed is largest may fall behind the processing of threads of groups 2 and 3, and such a case will be the case (4) which is after the invention is applied and takes long time. However, even in this case, processing time of case (4) which is after the invention is applied and takes long time is shorter by 2 T compared with case (2) which is before the invention is applied and takes long time.

FIG. 12 is a figure showing example 1 in which data imbalance occurs and the processing of another transaction is also performed.

It is supposed that processing of another transaction Y has interrupted while processors P1 and P2 me processing a certain transaction X. Suppose transaction X has imbalance of the amount of data, and transaction Y has no imbalance of the amount of data. When two processors P1 and P2 process transaction Y uniformly, processing of transaction X is delayed as much as interrupted by transaction Y. However, like the example of FIG. 10, the present invention can have the effect.

(1) is a pattern before the invention is applied and when processing time of transaction X is long and (2) is a pattern before the invention is applied and when processing time of transaction X is short. (2) is also the pattern after the invention is applied. Because the present invention performs above-mentioned grouping, execution sequence after the invention is applied will be the pattern of (2) and will not be the pattern of (1). And (2) is shorter than (1) by 3 T in processing time.

Figure 13:
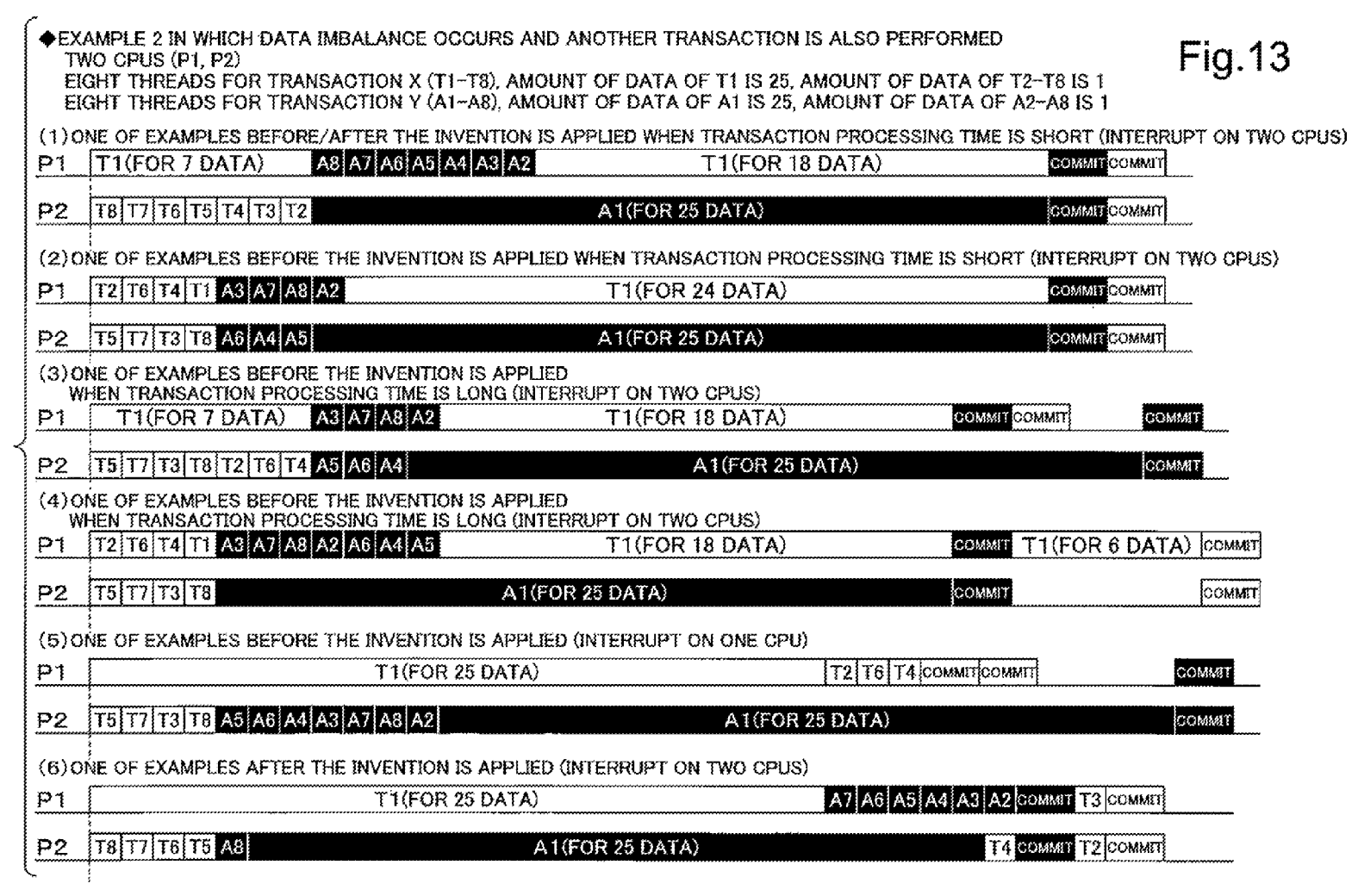

FIG. 13 is a figure showing example 2 in which data imbalance occurs and the processing of another transaction is also performed.

In the example of FIG. 13, there is imbalance of the amount of data in both transactions X and Y, and transaction Y interrupts the processing of two processors P1 and P2. In processors P1 and P2, processing time of transaction becomes longer as much as the processing which transaction Y interrupted.

In examples shown in (1) and (2), processors P1 and P2 process both transactions X and Y without generating unused time even before the invention is applied. Therefore, processing time of both transactions X and Y is short.

In examples shown in (3) and (4), the way of assigning threads of each transaction to processors P1 and P2 is different from (1) and (2). For this reason, processors P1 and P2 generate unused time, and processing time of transactions X and Y becomes long. That is, in (3), after the commit processing of transaction X, there is unused time in processor P1. In (4), after the commit processing of transaction Y, there is unused time in processor P2.

After the invention is applied, the threads of each transactions X and Y are divided into groups, thread T1 belonging to the first group and threads T8-T2 belonging to the second group (in case of transaction Y, "T" is substituted for by "A"). T1 of the first group and T8 of the second group request allocation of processors P1 and P2. Threads of the second group request allocation of processors P1 and P2 in turn. Therefore, execution sequence after the invention is applied will be the pattern of (1), not (2), (3) or (4), and will be the pattern whose transaction processing time is shorter compared with (3) and (4).

In case there is imbalance of the amount of data in both transactions X and Y, and transaction Y interrupts only processor P2, execution sequence before the invention is applied has the possibility to be the pattern of (5). However, after the invention is applied, processors P1 and P2 do not defer processing of thread A1 which is requesting allocation of a processor from the beginning of transaction Y, similar to the case in (5).

As shown in (6), processors P1 and P2 process thread A1 prior to the threads of A7 and after. In the case shown in (6), thread A1 of the first group and thread A8 of the second group are issuing an allocation request of processors P1 and P2 at almost simultaneous time. At that moment, because processing of A8 has not completed, thread A7 of the second group is not issuing processing request to processors P1 and P2. And processor P2 starts processing of thread A8 first and after completion, starts processing of thread A1. After that, processor P1 which has no processes to perform, processes transaction Y which includes thread A7 and after. In this way, (6) completes transaction shorter in time than (5).

Below is a description of a modification of the first embodiment.

By replacing transaction Y in FIG. 12 and FIG. 13 with other processing (calculations), the first embodiment can be applied for a case processors P1 and P2 perform other processing than the transaction. Even in that case, the first embodiment can get the effect as described in FIG. 12 and FIG. 13.

The first embodiment can change the number of processor P[I] to operate. In case the number of threads to be executed is larger than the number of processor P[I], the first embodiment has the effect.

The first embodiment can change the number of data processing control unit CT 200. Multiprocessor system 001 can perform the same number of transaction processing as the number of data processing control unit CT 200 simultaneously.

The first embodiment can also be applied to cases when time needed for processing data with the same size varies. In that case, multiprocessor system 001 introduces a relative numerical value which represents the complexity of the processing of data and replaces the amount of data in the above-mentioned example of operation with the relative numerical value multiplied by the amount of data.

Below is a description about the effect of the first embodiment.

The first embodiment has the effect that it is not likely for the processing efficiency of the whole transaction to degrade even when the amount of data to be processed increases only for a part of threads. The reason is because plurality of threads are grouped so that the amount of data to be processed becomes as equal as possible, and processed.

In multiple threads processing, resource conflict between each thread has an influence on processing performance. In order to avoid this influence, if a system divides and keeps a table which is accessed by each thread, each thread can avoid resource conflict In order for that, the system needs to decide uniquely the threads which process the data depending on the contents or classification of the data. Here, when the system decides uniquely the threads which processes the data depending on the contents or classification of the data, the amount of data to be processed by a part of threads could increase. For example, in such a case, the first embodiment has the effect that it is not likely for the processing efficiency of the whole transaction to degrade.

Below is a description about the second embodiment. The second embodiment sets the high priority to the threads whose amount of data to be processed is large and performs processing.

Figure 14:
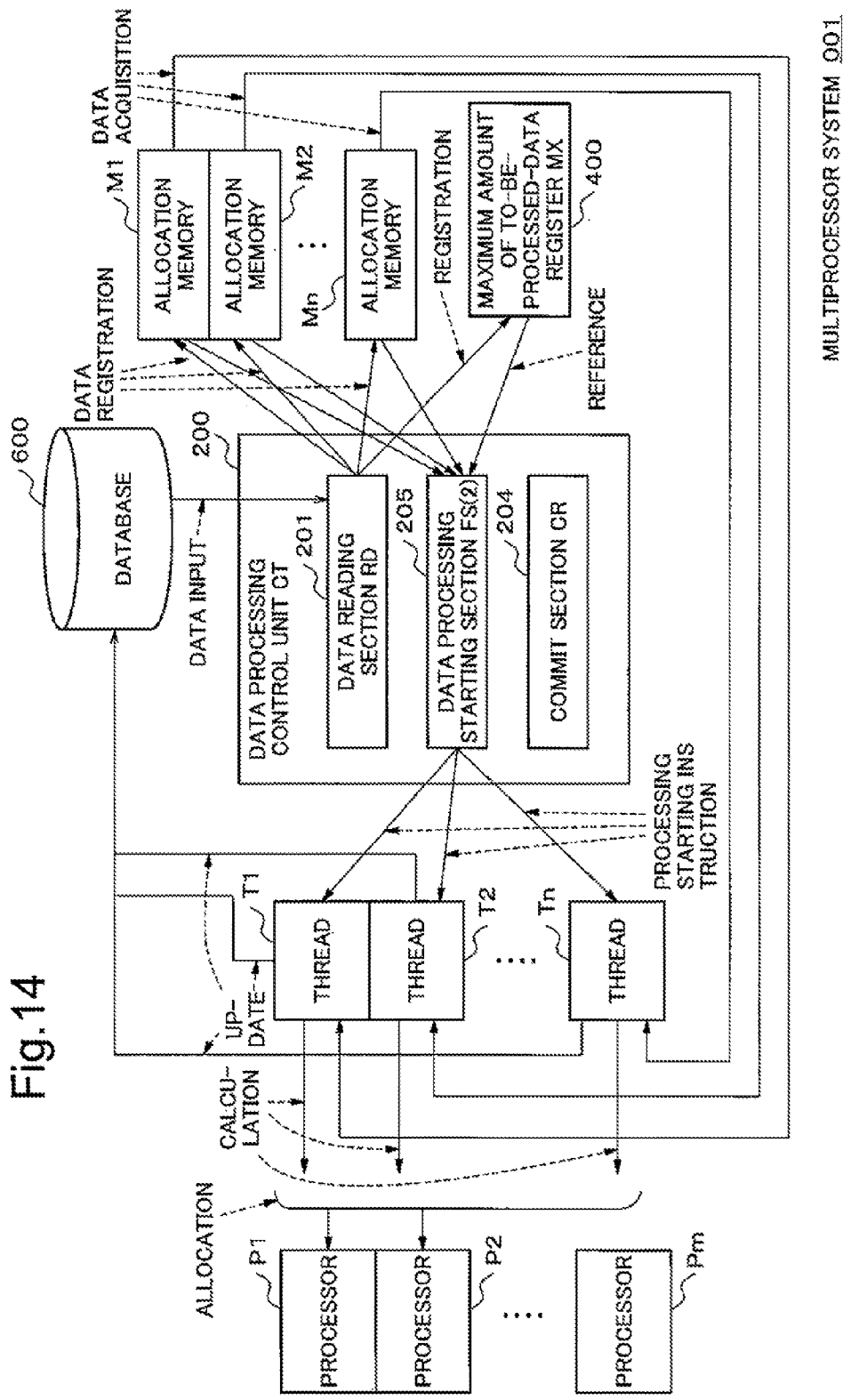
FIG. 14 is a figure showing a structure of multiprocessor system 001 of the second embodiment

FIG. 14 is a figure which shows a structure of multiprocessor system 001 of the second embodiment. Compared with FIG. 5, FIG. 14 is different in such points as data processing starting section FS 202 is changed to data processing starting section FS(2) 205, and next data processing starting section NS 203 and processed data counter PC 500 are deleted.

Figure 15:
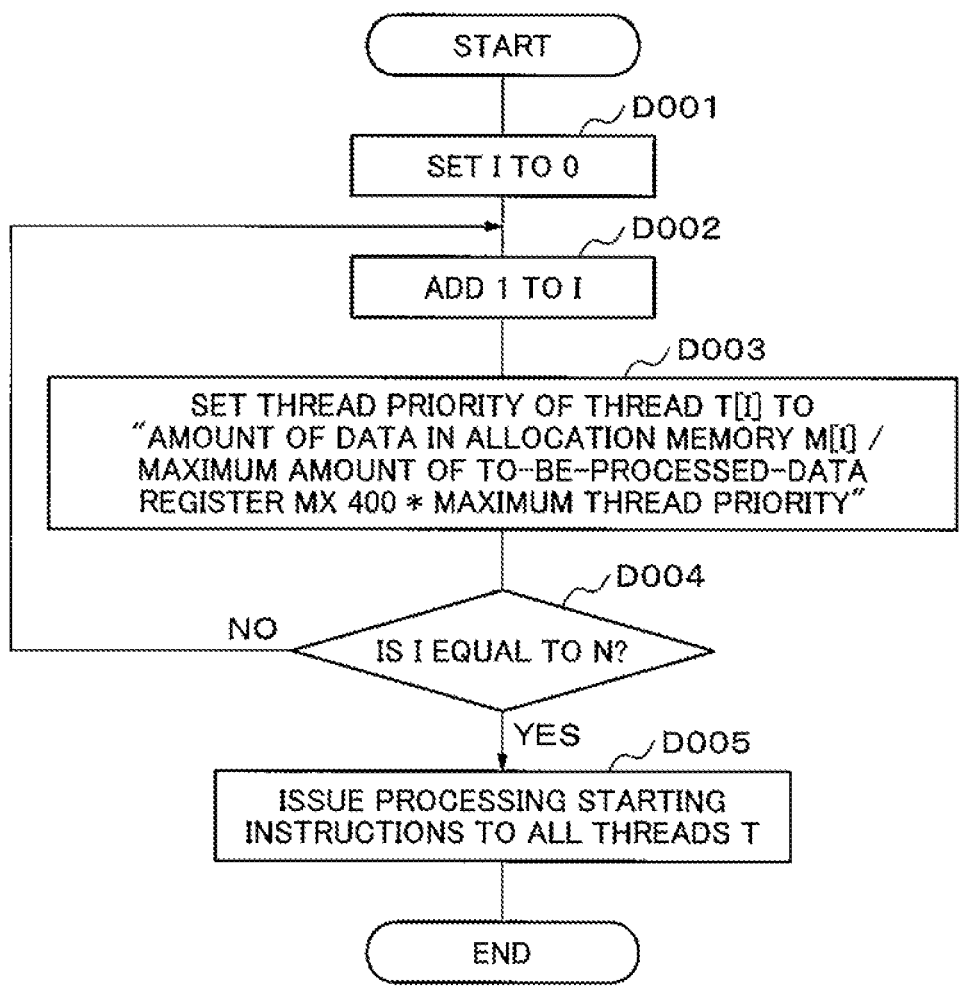
FIG. 15 is a flow chart showing operations of data processing starting section FS (2) 205

FIG. 15 is a flow chart showing operations of data processing starting section FS(2). First, data processing starting section FS(2) 205 sets variable I to 0 (D001). Next, data processing starting section FS(2) 205 adds 1 to I (D002). Next, data processing starting section FS(2) 205 sets the thread priority of thread T[I] to "amount of data in allocation memory M[I]/ value MX stored in maximum amount of to-be-processed-data register MX 400 * maximum thread priority" (D003).

That is, by dividing "the amount of data" stored in allocation memory M[I] by value MX stored in maximum amount of to-be-processed-data register MX 400, data processing starting section FS(2) 205 normalizes "the amount of data" stored in allocation memory M[I] by the value MX stored in maximum amount of to-be-processed-data register MX 400. And data processing starting section FS(2) 205 multiplies the normalized value and the maximum thread priority.

For example, in case the range of the thread priority is 0-10, the thread priority of the thread whose amount of data to be processed is large becomes near the maximum thread priority 10, and the thread priority of the thread whose amount of data to be processed is small approaches 0.

Here, in case the minimum thread priority is not 0, data processing starting section FS(2) 205 makes "amount of data" stored in allocation memory M[I]/value MX stored in maximum amount of to-be-processed-data register MX 400* (maximum thread priority−minimum thread priority)+minimum thread priority" as the thread priority. For example, in case the minimum thread priority is 1, not 0, data processing starting section FS(2) 205 makes the value obtained by the above-mentioned expression as the thread priority, and can make the range of the thread priority to 1-10.

Next, data processing starting section FS(2) 205 judges if I is equal to n (D004). If I is equal to n (D004, Yes), data processing starting section FS(2) 205 issues a processing starting instructions to all threads T (D005). If I is not equal to n (D004, No), data processing starting section FS(2) 205 goes to the processing of D002.

After the processing of D005 by data processing starting section FS(2) 205, processor P[I] executes all threads T. At that time, processor P[I] performs execution from a thread with high thread priority.

The second embodiment also has the effect that it is not likely for processing efficiency of the whole transaction to degrade even when the amount of data to be processed increases for a part of threads. That is because data processing starting section FS(2) 205 sets the high thread priority to the threads whose amount of data to be processed is large, and processor P[I] performs execution from the threads with high thread priority.

As above, the present invention has been described with reference to an exemplary embodiment. However, the present invention is not limited to the above-mentioned exemplary embodiment Various changes can be performed to the configuration or details of the present invention, within the scope of the present invention, and to the extent a person skilled in the art can understand.

The present invention is applicable to data processing by a host computer for online transaction, data processing by a host computer for batch processing and so on.

The invention claimed is:

1. A multiprocessor system comprising:
 a plurality of processors executing multiple threads to process data; and
 an unit which, based on an amount of data to be processed for each thread, determines a condition which an order in which the plurality of processors execute the threads should satisfy and starts to execute each thread so that the condition is satisfied, wherein the unit, based on an amount of data to be processed for each thread, divides a plurality of threads into a plurality of groups, and starts to execute at most one thread of each of the plurality of groups,
 wherein the unit forms
 a first group which includes a thread whose amount of data to be processed is largest;
 a second group which includes a plurality of threads that have a difference, between the total amount of data to be processed for the plurality of threads and the total amount of data to be processed for the threads of the first group, less than a value which satisfies a condition; and
 a third group which includes a thread which does not belong to the first group or the second group, and wherein the second group includes the plurality of threads whose total amount of data to be processed is more than the total amount t of the first group, and the difference is less than an amount of data to be processed by one of the plurality of the threads.

2. The multiprocessor system according to claim 1, wherein the unit when the thread has completed data processing and there is a thread whose data is unprocessed within the group to which the thread belongs, starts to execute a thread whose data is unprocessed.

3. The multiprocessor system according to claim 1, wherein the unit when the thread has completed data processing and there are no threads whose data is unprocessed within the group to which the thread belongs, starts to execute a thread of another group whose data is unprocessed.

4. A multiple threads processing method comprising:
   based on an amount of data to be processed for each thread, determining a condition which an order in which a plurality of processors execute threads should satisfy, and making a plurality of processors start to execute each thread so that the condition is satisfied,
   wherein, based on an amount of data to be processed by each thread, dividing a plurality of threads into a plurality of groups; and
   making at most one thread of each of the plurality of groups started to execute, and forming
   a first group which includes a thread whose amount of data to be processed is largest:
   a second group which includes a plurality of threads that have a difference, between the total amount of data to be processed for the plurality of threads and the total amount of data to be processed for the threads of the first group, less than a value which satisfies a condition; and
   a third group which includes a thread which does not belong to the first group or the second group,
   wherein the second group includes the plurality of threads whose total amount of data to be processed is more than the total amount of data of the first group and the difference is less than an amount of data to be processed by one of the plurality of the threads.

5. The multiple threads processing method according to claim 4, wherein when the thread has completed data processing and there is a thread whose data is unprocessed within the group to which the thread belongs, making the unprocessed thread started to execute.

6. The multiple threads processing method according to claim 4, wherein when the thread has completed data processing and there are no threads whose data is unprocessed within the group to which the thread belongs, making a thread of another group whose data is unprocessed started to execute.

7. A non-transitory computer readable recording medium which makes a computer function as a means which, based on an amount of data to be processed for each thread, determines a condition which an order in which a plurality of processors execute the threads should satisfy and makes the plurality of processors start to execute each thread so that the condition is satisfied; and based on an amount of data to be processed for each thread, divides a plurality of threads into a plurality of groups, and makes at most one thread of each of the plurality of groups started to executer, and forms
   a first group which includes a thread whose amount of data to be processed is largest;
   a second group which includes a plurality of threads that have a difference, between the total amount of data to be processed for the plurality of threads and the total amount of data to be processed for the threads of the first group, less than a value which satisfies a conditions; and
   a third group which includes a thread which does not belong to the first group or the second group, and
   includes in the second group the plurality of threads whose total amount of data to be processed is more than the total amount of data of the first group, and the difference is less than an amount of data to be processed by one of the plurality of the threads.

8. The non-transitory computer readable recording medium according to claim 7 which makes the computer function as the means which, when the thread has completed data processing and there is a thread whose data is unprocessed within the group to which the thread belongs, makes a thread whose data is unprocessed started to executed.

9. The non-transitory computer readable recording medium according to claim 7 which makes the computer function as the means which, when the thread has completed data processing and there are no threads whose data is unprocessed within the group to which the thread belongs, makes a thread of another group whose data is unprocessed started to execute.

* * * * *